INVENTORS
Jan Jerie, Zdeněk Fencl

Nov. 25, 1958 J. JERIE ET AL 2,861,423
COMBINED COMBUSTION CHAMBER FOR BURNING
PULVERIZED FUEL AND FLY-ASH SEPARATOR
Filed June 13, 1956 3 Sheets-Sheet 2

INVENTORS
Jan Jerie, Zdeněk Fencl
BY Richard ...

United States Patent Office 2,861,423
Patented Nov. 25, 1958

2,861,423
COMBINED COMBUSTION CHAMBER FOR BURNING PULVERIZED FUEL AND FLY-ASH SEPARATOR

Jan Jerie and Zdeněk Fencl, Prague, Czechoslovakia

Application June 13, 1956, Serial No. 591,038

Claims priority, application Czechoslovakia June 16, 1955

6 Claims. (Cl. 60—39.46)

The present invention relates to a combustion chamber for a pulverized fuel turbine.

A pulverized fuel turbine places entirely special requirements on the design of a combustion chamber. The latter has to comply not only with the known conditions applying to combustion chambers of gas turbines in general (i. e. high efficiency in the whole range of control, uniform distribution of temperature of exhaust gases in the outlet, favorable properties during starting, high lifetime, small dimensions, easy control and small thermal capacity, and the like), but has also to deal with a new extraordinarily important requirement on the purity of the exhaust gases. Solid residues after the combustion of a solid fuel would cause a dangerous erosion of the turbine or its fouling.

The cleaning of the products of combustion is effected in the known designs of pulverized fuel turbines mostly by means of aeromechanical purifiers (cleaners), which are interposed as a new element between the combustion chamber and the gas turbine. Experiments are also being carried out to directly clean the products of combustion in a combustion chamber of the cyclone type, in which the coal is burnt at such high temperatures that the slag is withdrawn in a liquid state, but even in such cases a special separator is placed between the combustion chamber and the turbine. The above mentioned designs cause therefore in the first place the complexity of the whole device. Further a new problem arises, how to suitably design the aeromechanical separator itself with the inlet and outlet pipes. This is a problem both of arrangement and aerodynamics, which is difficult to solve, because usually when conditions of arrangement are satisfactorily complied with, the aerodynamic conditions become less favorable and in this way an undesirable deterioration in the operation of the separator as well as an increase of flow resistances are caused. It may also be ascertained on hand of known designs that the above mentioned problem of the combustion chamber has not yet been satisfactorily solved in all respects.

The subject of the present invention is a combustion chamber for a pulverized fuel turbine arranged in such a way as to safeguard a high energetic efficiency combined with favorable conditions of arrangement and aerodynamics. The main feature of the improvement according to the invention is a connection or combination of the entire system of the combustion chamber, consisting substantially of a combustion, mixing and separating part, into one structural unit, which is built in a common pressure vessel. A further feature of the improvement according to the invention resides therein that in the design of the individual parts new findings relating to the flow of gases, entraining solid particles, are consequently made use of, the static and kinetic energy of the flowing gases being utilized in the whole range of the operative spaces:

(a) For securing the combustion process itself, (b) For gradual separation of solid particles from the exhaust gases, (c) For cooling the walls of the working spaces and for eliminating the formation of deposits, (d) For the withdrawal of separated particles.

By the design according to the invention entirely new conditions are produced, which safeguard the required operation under reduced requirements on the resistance of the employed material, weight, construction space and investment cost. This is, of course, of high importance for pulverized fuel turbines not only of the stationary but also of the mobile and in particular tractional type.

In the following disclosure the basic arrangement of a combustion chamber for a pulverized fuel turbine according to the invention will be explained by way of example with reference to the accompanying diagrammatic drawings, in which.

Corresponding or identical parts are identified by the same reference numerals in all views of the drawings.

Figure 1:
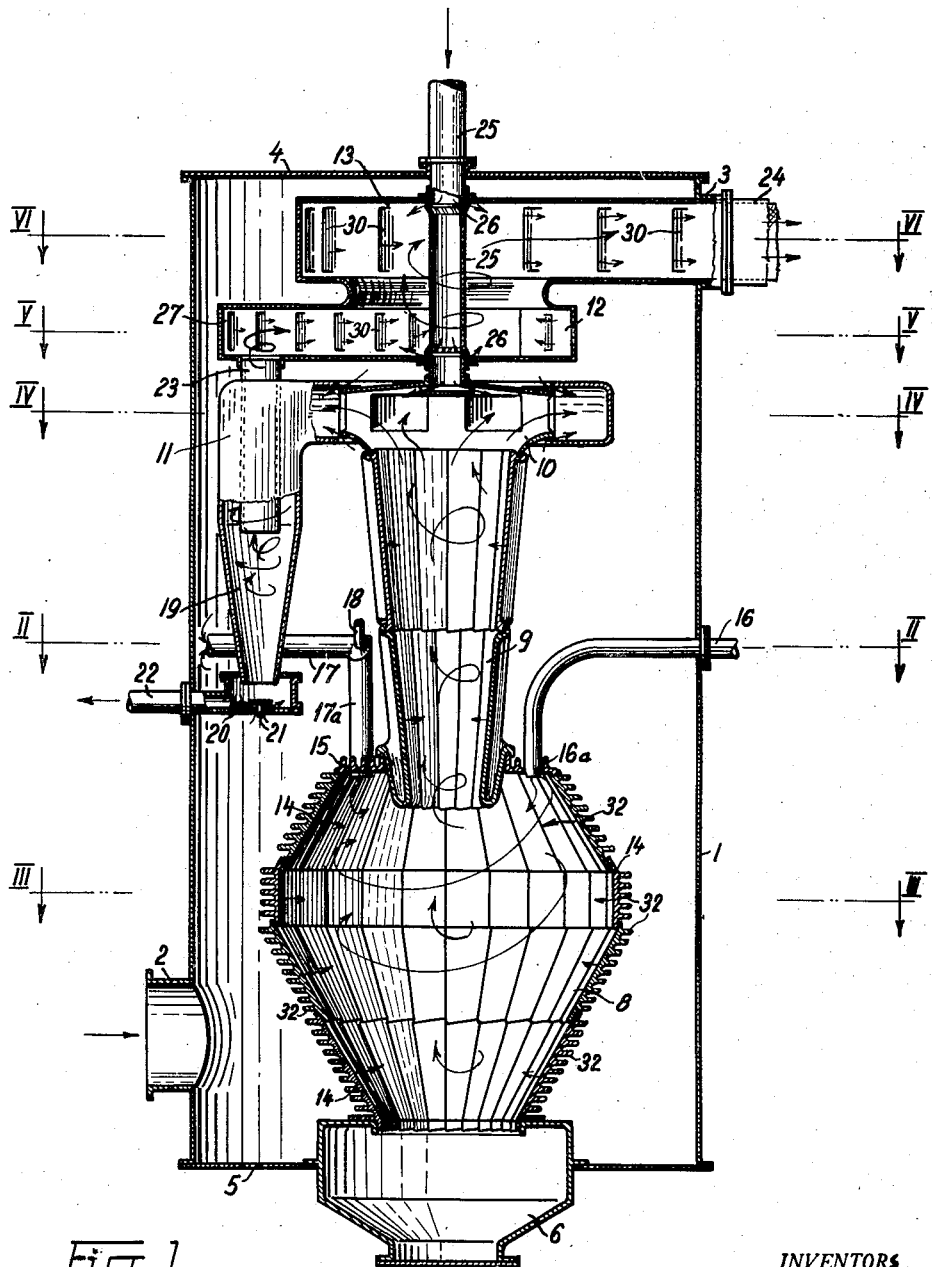
Fig. 1 is a diagrammatic, vertical sectional view of a combined combustion chamber and fly-ash separator embodying this invention.

The outer pressure vessel consists of a jacket 1 (Fig. 1) in the shape of a cylinder, provided with inlet and outlet pipes 2 and 3, respectively, and closed at its upper and lower ends by covers 4 and 5.

In the lower cover 5 a receptacle 6 in the shape of a body of rotation is secured, serving for the reception of solid waste and provided with a bottom closure 7.

All operative parts of the combustion chamber and fly-ash separator, combined into one structural unit, are built in the pressure vessel 1, namely: the flame chamber 8, the mixer 9 terminated by a distributor head 10, separators 11 of the cyclone type, tangential outlets 12 and a spiral outlet chamber 13. All these parts have substantially the shape of bodies of rotation or axial-symmetrically arranged bodies and are principally designed in such a way as to constantly maintain the same direction of rotation of the medium flowing therethrough. This is achieved substantially by means of tangential inlets of the fuel and of the cooling or mixing air, as will be explained hereinafter.

Figure 3:
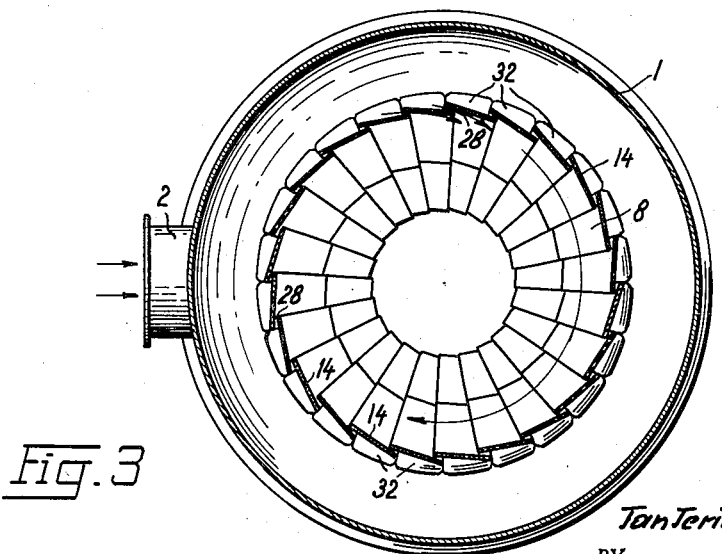
Fig. 3 is a sectional view along the line III—III of Fig. 1.

The wall of the flame chamber 8 having the shape of a body of rotation is made of partial segments 14 overlapping each other so as to eliminate additional thermal stresses of the wall. In order to increase the cooling effect the segments 14 are provided with ribs 32 (Figs. 1 and 3) at their outside and with slits 28 between the successive segments 14 to introduce cooling air tangentially into a boundary layer at the inner heated side of the flame chamber wall, as shown in the sectional view in Fig. 3.

Figure 2:
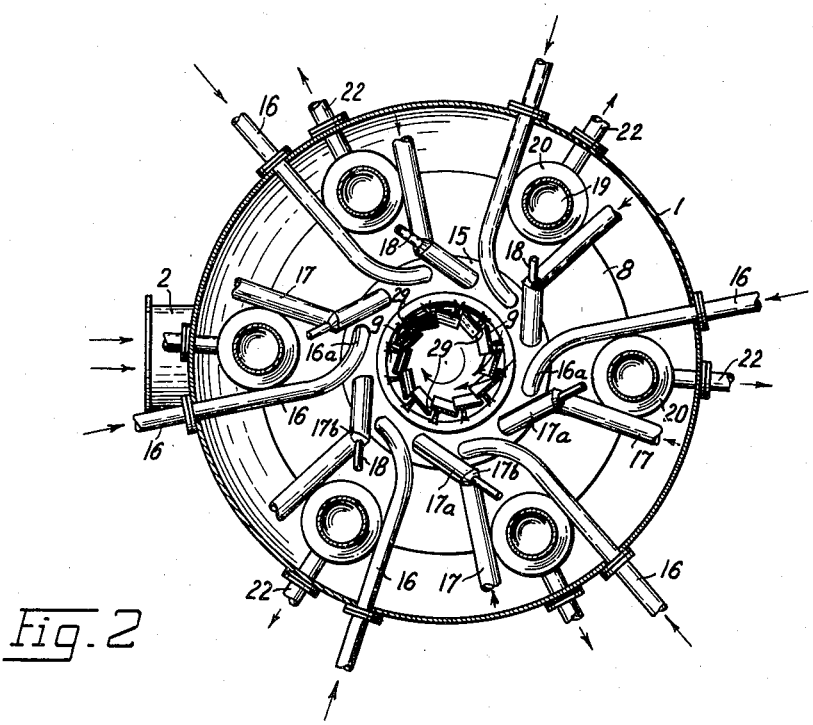
Fig. 2 is a sectional view along the line II—II of Fig. 1.

Pulverized fuel (coal) carried by compressed air is supplied to the chamber 8 by a system of tubes 16 passing through a burner plate 15 and terminating in nozzles 16a which are directed in tangential direction. The arrangement of the tubes 16 for supplying pulverized fuel (coal) is shown in Fig. 2. A system of tubes 17 for supplying air from the space within the enclosing vessel is further provided in the burner plate 15. The tubes 17, placed and arranged as shown in Fig. 2, connect the space within the jacket 1 with the flame chamber 8. The outlets of the tubes 17 opening into the flame chamber are also inclined in a substantially tangential direction, as at 17a (Fig. 2), in order to ensure rotation of the burning contents of the flame chamber. For the purpose of starting, an additional ignition fuel, usually liquid, may be introduced into the tubes 17, for instance through auxiliary burners 18 provided at the elbows 17b of the tubes 17.

A mixer 9 of a suitable conical shape is attached to the flame chamber, and a predetermined quantity of air from the space within the enclosing vessel 1 is mixed, in the mixer 9 with the products of combustion emerging from the flame chamber 8. In order to eliminate any additional thermal stresses the mixer 9 is also formed of overlapping segments permitting dilation and provided with slits 29 introducing air tangentially into the boundary layer at the inner heated surface of the mixer (see Fig. 2), in order to maintain the rotation of the stream and simultaneously cool the mixer.

Figure 4:
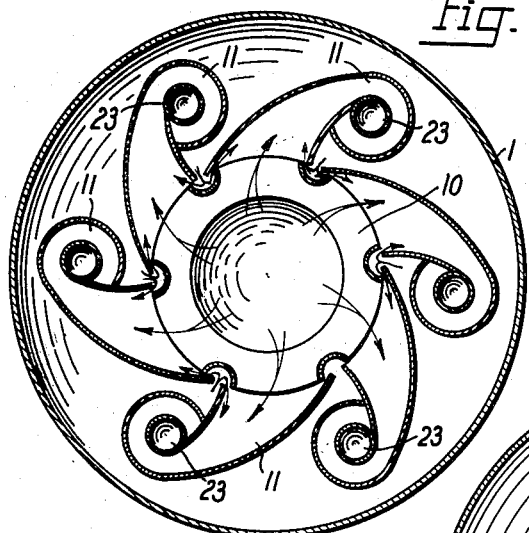
Fig. 4 is a sectional view along the line IV—IV of Fig. 1.

The mixer 9 opens upwardly into a distributor head 10 which distributes the stream uniformly into aeromechanical cyclone separators 11, symmetrically situated around the mixer 9 with the axes of separators 11 extending parallel to the axis of mixer 9, as shown in Fig. 4. The separated solid particles, in the shape of a fine fly ash, fall through conical tubular extensions 19 into dust removing chambers 20 from which they are blown out through a pipe 22 by a small amount of exhaust gases. Distributors 21 at the bottom of the dust removing chambers, supplied with pressure air from the enclosing vessel 1, prevent the formation of deposits of the fly ash.

Figure 5:
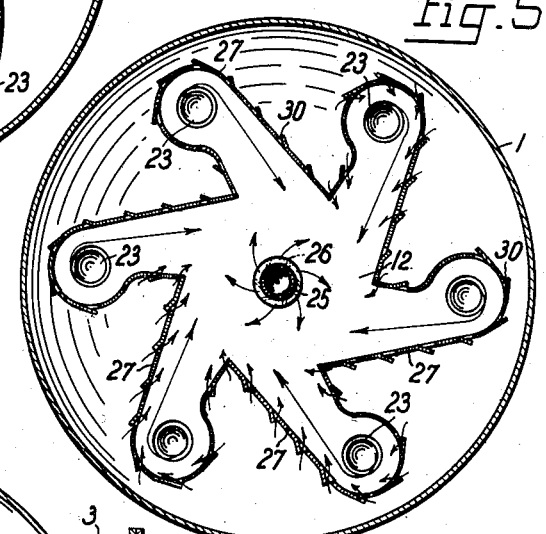
Fig. 5 is a sectional view along the line V—V of Fig. 1.
Figure 6:
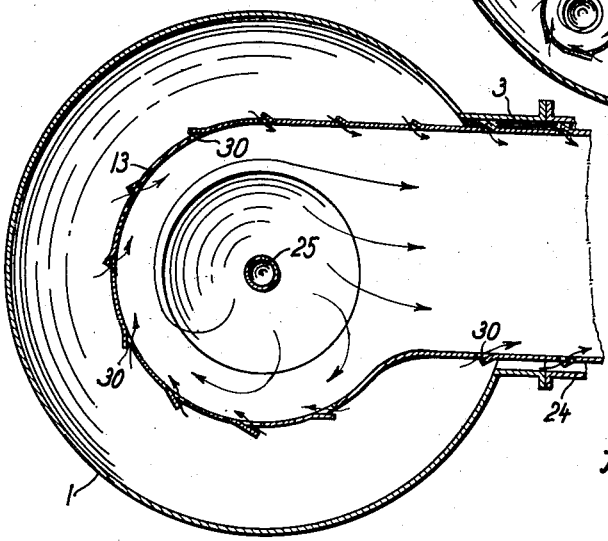
Fig. 6 is a sectional view along the line VI—VI of Fig. 1.

The cyclone separators 11 have outlet tubes 23 which open upwardly into outlet passages 27 which are symmetrically arranged about the vertical axis of the assembly, and which open tangentially into a collecting chamber 12 operating to concentrate the cleaned exhaust gases and to convey the same into the outlet chamber 13, the spiral shape of which is apparent from Fig. 6. The outlet passages 27 and the collecting chamber 12, Fig. 5, as well as the outlet chamber 13, Fig. 6, are provided with slits 30 (Figs. 5 and 6) for introducing air from the space of the jacket 1 into the boundary layer on the heated portion of their walls. In this way an efficient cooling of walls of these parts from both sides is achieved and by the admixture of cooling air the exhaust gases, that is, the products of combustion having the fly-ash removed therefrom, are simultaneously cooled to the required temperature of admission into the turbine to which they are fed. As is apparent from Figs. 1 and 6, the outlet pipe 24 extending from chamber 13 also is provided with means for introducing a boundary layer of cooling air, so that practically the entire supply of cooling air is gradually admixed to the exhaust gases.

A tube 25 passes through the center of the upper cover 4 of the enclosing vessel, and supplies fresh cooling air from the same source of pressure which supplies the pipe 2. The tube 25, reaching as far as the space between the distributor head 10 and the collecting chamber 12 is provided with distributors 26 (Figs. 1 and 5), emitting a tangential stream of fresh air in the direction of the general rotation of the products of combustion and exhaust gases to prevent the formation of deposits on the horizontal walls of the members 10, 12 and 13, while cooling them efficiently at the same time.

The operation of the combined combustion chamber and fly-ash separator as well as of the individual members thereof has been indicated generally in the preceding disclosure and is also apparent from Fig. 1. After having been ignited with a suitable fuel, the pulverized fuel (coal) burns in the flame chamber 8 in a whirling motion caused by the tangential introduction of the pulverized fuel through the tubes 16 and of air from the enclosing vessel through slits 28 between the segments of the liner 14.

The coarser particles of ash fall into the receptcle 6 from which they are periodically withdrawn. The stream of combustion products, that is, gases with a content of fine fly ash, passes through the mixer 9 in which the rotation of the stream is maintained also by a tangential supply of cooling and mixing air through slits 29 in the segments of the mixer.

The stream is uniformly distributed by the distributor head 10 in the same sense of rotation into cyclone separators 11 in which the finer particles of fly ash are separated by centrifugal force. The stream of the mixture of gases suitably freed from solid particles is under continuous rotation, assisted by further tangential supplies of mixing and cooling air, concentrated by the collecting chamber 12 and at a suitable temperature fed through the outlet chamber 13 and pipes 3 and 24 to the turbine. The cleaned gases from the cyclones 11 are introduced into the collecting chamber 12 through the passages 27 opening tangentially into the latter so that the kinetic energy of the rotational component of the flow in the cyclones and in the collecting chamber is utilized for increasing the static pressure of the gases in the outlet pipe.

The cooling and mixing air is supplied from a source of pressure into the enclosing vessel 1 through the pipe 2 and partially also through the tube 25. The cooling and mixing air supplied into the enclosing vessel through the main inlet pipe 2 flows around all operational parts of the system and penetrates also into the boundary layers at the inner heated sides of the walls where it becomes gradually mixed with the exhaust gases for suitably reducing their temperature. The wall of the flame chamber 8 which is subject to the highest thermal stresses is cooled by fresh air. The upper wall of the distributor head 10 against which strikes the stream of exhaust gases still having a relatively high temperature, is thus subject to an increased thermal stress. In order to mitigate this thermal stress, additional fresh cooling air is admitted by the tube 25 into this space, said air being introduced by means of distributors 26 into boundary layers on the heated sides of the respective walls.

The disclosed arrangement of the pulverized fuel (coal) combustion chamber, connected with a cyclone cleaner in one unit, has a number of important advantages. The axially symmetrical arrangement of the cyclones around the mixing space of the combustion chamber proper, creates aerodynamically ideal conditions for safeguarding identical working conditions in the individual cyclone cells and thus their good efficiency. The combustion chamber and cyclones themselves are placed in a common pressure vessel, their walls being thus relieved from stresses caused by the pressure of air and gases. This facilitates the choice of material capable of fulfilling the reduced requirements imposed thereon. The enclosing vessel of the chamber which is exposed to stresses caused by the pressure of air, is at the same time protected against the influence of high temperature and may be made of common steel. Also the interior operative members of the chamber are efficiently and uniformly cooled and may therefore be made of current heat resisting alloys not requiring any strategic alloying material.

We claim:

1. A combined combustion chamber and fly-ash separator for a pulverized fuel turbine, comprising a closed pressure vessel, means for supplying compressed air to the interior of said vessel, a flame chamber in said vessel, means for introducing a pulverized fuel and air from said vessel into said chamber to effect primary combustion in the latter, a co-axial mixer receiving products of the primary combustion from said flame chamber and having means for mixing additional air therewith to effect secondary combustion of the fuel in said mixer, a distributor head receiving the products of secondary combustion from said mixer, a plurality of cyclone separators extending parallel to axis of said flame chamber and mixer and arranged within said vessel symmetrically about the axis of the flame chamber and mixer, said separators receiving the products of secondary combustion from said distributor head to separate solid particles from the gaseous products of combustion, a collecting chamber receiving the gaseous products of combustion from said separators and concentrating said gaseous products of combustion, and an outlet chamber communicating with said collecting chamber, said collecting and outlet chambers being also disposed within said vessel.

2. A combined combustion chamber and fly-ash separator for a pulverized fuel turbine, comprising an enclosed vessel, means for supplying compressed air to said vessel, a body within said vessel defining a flame chamber, means introducing a pulverized fuel and air tangentially into said chamber to effect primary combustion of the fuel and a swirling movement within said chamber, a mixer coaxial with said flame chamber and receiving the products of combustion from said chamber, said mixer having means for tangentially introducing secondary air from said vessel into the interior of the mixer to mix with the products of combustion for completing the burning of the fuel and for cooling the products of combustion while swirling the latter in the same direction as the swirling movement in the flame chamber, a distributor head coaxial with the mixer receiving the cooled products of combustion from said mixer and having tangentially directed distributing ducts, a plurality of cyclone separators in said vessel arranged symmetrically about said flame chamber and mixer with the axes of said separators extending parallel to the axis of said flame chamber, said distributing ducts opening tangentially into said separators to produce rotation of the distributed products of combustion in the separators in the same direction as the swirling movements in said flame chamber and mixer, said separator operating to separate solid particles from the gaseous products of combustion, a collecting chamber in said vessel coaxial with said flame chamber and mixer, ducts opening from said separators tangentially into said collecting chamber so that the gaseous products of combustion are fed from the separators to the collecting chamber for swirling movement in the latter in the same direction as said swirling movement in the flame chamber, and outlet means receiving the swirling movement of gaseous products of combustion from said collecting chamber for tangential discharge from said vessel.

3. A combined combustion chamber and fly-ash separator for a pulverized fuel turbine as in claim 2; wherein said means introducing a pulverized fuel and air into the flame chamber includes pulverized fuel supply ducts extending into said flame chamber and terminating in tangentially directed nozzles, tangential slits in the flame chamber for admitting compressed air from said vessel into the interior of said flame chamber, and tubes opening tangentially from the interior of said vessel into said flame chamber for supplying additional air to the latter in the regions of said nozzles.

4. A combined combustion chamber and fly-ash separator for a pulverized fuel turbine as in claim 3; further comprising burners in said tubes supplying a fluid igniting fuel for use during starting.

5. A combined combustion chamber and fly-ash separator for a pulverized fuel turbine as in claim 2; further comprising a duct for supplying fresh cool air extending coaxially with respect to said collecting chamber and distributor head, said collecting chamber and distributor head having walls which extend radially with respect to the axis of said flame chamber, and air distributors on said duct for supplying fresh cool air and opening tangentially adjacent said radial walls of the collecting chamber and distributor head to produce a swirling movement of cool air over said radial walls in the same direction as the swirling movements in said collecting chamber and distributor head.

6. A combined combustion chamber and fly-ash separator for a pulverized fuel turbine as in claim 5; further comprising dust removing chambers at the bottom of said cyclone separators, and means admitting compressed air from said vessel into said dust removing chamber to prevent the deposit in the latter of separated fly-ash.

References Cited in the file of this patent

UNITED STATES PATENTS

| | | |
|---|---|---|
| 2,583,921 | Yellott | Jan. 29, 1952 |
| 2,616,256 | Davy et al. | Nov. 4, 1952 |